United States Patent [19]
Kaolian

[11] Patent Number: 5,122,798
[45] Date of Patent: Jun. 16, 1992

[54] AIRPORT GROUND LIGHT ARRANGEMENT

[76] Inventor: Morgan Kaolian, 543 Savoy St., Bridgeport, Conn. 06604

[21] Appl. No.: 522,735

[22] Filed: May 14, 1990

[51] Int. Cl.⁵ .............................. G08G 5/00
[52] U.S. Cl. .................. 340/947; 244/114 R; 340/953; 362/62; 362/376
[58] Field of Search ............... 340/947, 953, 981–983; 362/62, 376, 145, 226, 153.1, 285; 244/114 R

[56] References Cited

U.S. PATENT DOCUMENTS

| | | | |
|---|---|---|---|
| 2,557,165 | 6/1951 | Wyatt | 362/376 |
| 2,892,994 | 6/1959 | Ingraham | 340/953 |
| 3,805,055 | 4/1974 | Cassey | 362/358 |
| 4,180,850 | 12/1979 | Bivens | 362/145 |
| 4,302,799 | 11/1981 | Behrens | 362/62 |
| 4,910,649 | 3/1990 | Vadseth | 362/145 |

Primary Examiner—Jin F. Ng
Assistant Examiner—Brent A. Swarthout
Attorney, Agent, or Firm—Frank J. Thompson

[57] ABSTRACT

A disc arrangement is provided for positioning about airport lights for inhibiting erosion and suppressing foliage.

3 Claims, 2 Drawing Sheets

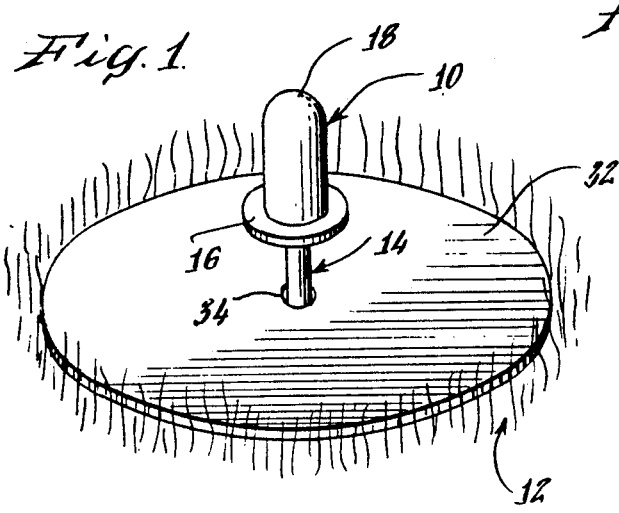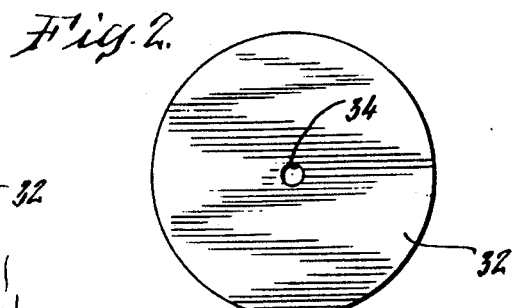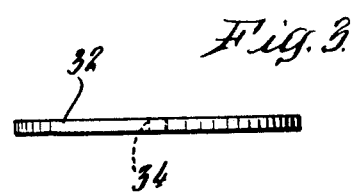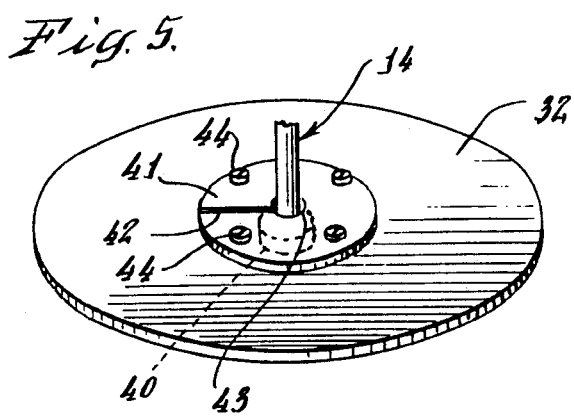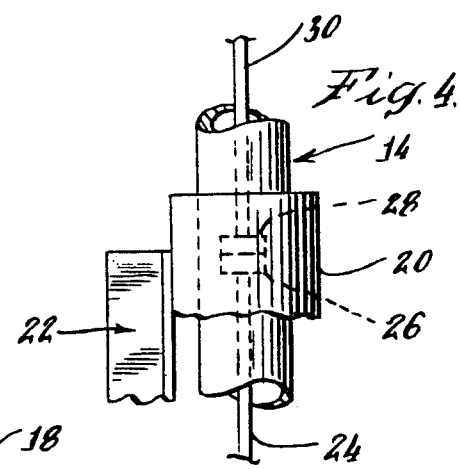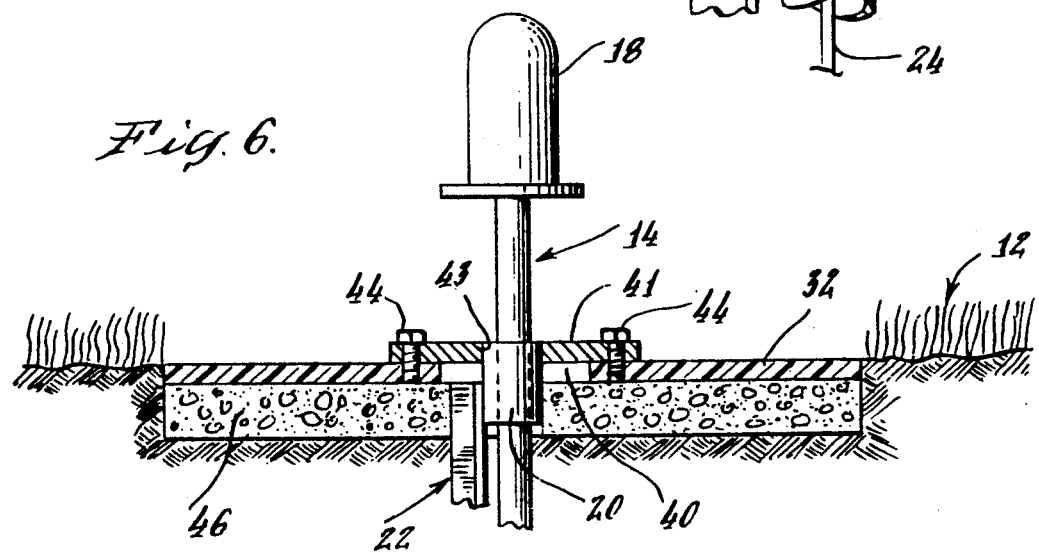

AIRPORT GROUND LIGHT ARRANGEMENT

BACKGROUND OF THE INVENTION

1. Field Of The Invention

This invention relates to airport ground lights for controlling the movement of aircraft. The invention relates more particularly to improvements for enhancing the visibility of airport ground lights.

2. Description Of The Prior Art

Airport ground lights are used to control the movement and placement of aircraft at an airport. Such lights which have predetermined colors associated with a particular control function are used as taxiway lights, landing lights, holding area lights and ramp lights where aircraft may be parked. These lights comprise a luminaire and a support body which both spaces and supports the luminaire above the ground at a predetermined height, generally about up to 14 inches. In many instances the lights are located immediately adjacent to but off a paved surface in a grass or sodded area so as to avoid impact by wheels and struts of aircraft which travel on the paved surface. Such lights are generally made frangible so as to break away when struck by an aircraft in order to avoid and minimize damage to the aircraft.

It is desirable and necessary that these lights be easily viewed from the aircraft by pilots in their cockpits and during the daylight period by airport maintenance personnel. However, in view of the grass and sodded terrain in which the lights are located, foliage often grows about the lights to the height of the lights thus reducing visibility of the lights and indeed at times obstructing viewing of the lights.

In order to maintain the visibility of these lights, it has been the practice to repeatedly mow the grass and sodded area about such light. However, such mowing is generally performed with a relatively large ganged mower which is not readily manuverable at locations relatively close to the lights. Attempts to mow foliage close to the light often results in impacting and dislodging the frangible support and sometime damaging the support. At times the frangible support may even damage the mower blades and the mower itself.

An alternative to mowing the undesired foliage is the spraying of herbicides to suppress or kill the foliage. However, all of the foliage is generally suppressed by this technique resulting in weathering and erosion of the area about the ground light. As a consequence, water ponding and exposure of subsoil occurs and ultimately corrosion of the substructure supporting the light. Jet blast often projects this material about and this is a hazard. Moreover, present day environmental factors tend to discourage the use of herbicides.

Another alternative employed for suppressing foliage around landing lights has been to cover the area about the light with gravel. This functions to suppress foliage growth. However, jet blasts have at times dislodged and blown the gravel about thereby creating a hazard to other aircraft and to personnel in the area.

These prior attempts to suppress the foliage about airport ground lights has been relatively ineffective and has been costly in terms of manpower, equipment and the replacement of damaged lights.

SUMMARY OF THE INVENTION

Accordingly, it is an object of this invention to provide an improved airport ground light arrangement.

Another object of the invention is to provide an airport ground light arrangement having an improved means for suppressing foliage.

Another object of the invention is to provide an airport ground light arrangement having a means for reducing soil erosion in an area about the light.

A further object of the invention is to provide an improved and relatively economical arrangement for suppressing the growth of foliage and reducing soil erosion at an airport ground light.

Still another object of the invention is to provide an improved arrangement for suppressing foliage and reducing soil erosion at an airport ground light which avoids the disadvantages of prior art arrangements.

Another object of the invention is to provide an airport ground light arrangement which enhances the visibility of the ground light.

In accordance with features of this invention, an improved aircraft ground light arrangement comprises an airport ground light and a semi-rigid, disc-shaped, body positioned about the light. The ground light includes a luminaire and a support body which both supports and spaces the luminaire above ground level. A means is provided for enabling the positioning of the disc body about the luminaire support body.

In a preferred embodiment, the disc body is circular shaped and has an outer diameter in the range of about 16 inches to about 60 inches. It is formed of a weather resistant material. A weather resistant material from which the disc body is fabricated preferably comprises a polymer plastic. In a preferred arrangement, a means for positioning the disc body about the airport light comprises an aperture extending through a thickness of the body and located substantially centrally in the disc shaped body. In an alternative arrangement, said means also include a relatively smaller disc shaped collar secured to the disc.

In accordance with other features of the invention, the visibility of the airport light is enhanced by providing a disc body having a bright color. Alternatively, the disc body is provided with a high visibility reflective means.

The airport light arrangement of the invention is relatively economical and easily installed, suppresses foliage, reduces soil erosion, enhances the visibility of the airport ground light, facilitates mowing grass outside the area covered by the disc body without damage to the airport ground light or to the mower and eliminates the use of herbicides.

BRIEF DESCRIPTION OF THE DRAWINGS

These and other objects and features of the invention will become apparent with reference to the specification and to the drawings wherein:

FIG. 1 is a perspective view of an airport ground light arrangement constructed in accordance with the features of this invention;

FIG. 2 is a plan view of a disc shaped body of the invention of FIG. 1;

FIG. 3 is a side elevation view of the disc shaped body of FIG. 2;

FIG. 4 is an enlarged fragmentary view of a luminaire support body and fixture mount for the same used with the airport light arrangement of FIG. 3;

FIG. 5 is a fragmentary perspective view of an alternative embodiment of the invention of FIG. 1;

FIG. 6 is an enlarged side elevation view, partly in section illustrating the installation of the device of FIG. 5;

DETAILED DESCRIPTION

Figure 7:
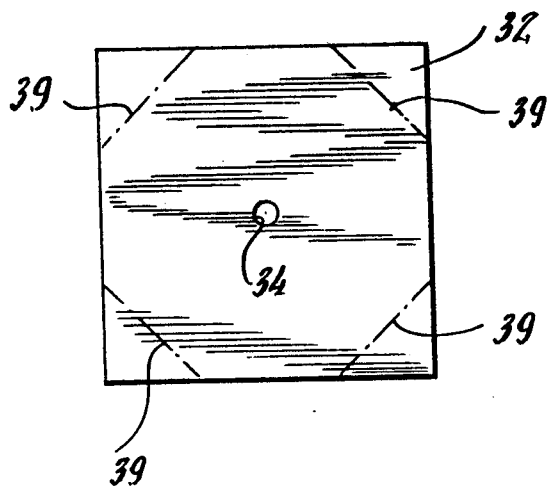
FIG. 7 is a plan view of an alternative disc shaped body of the invention.

Referring now to the drawings and particularly to FIG. 1, an airport ground light is shown to include a luminaire 10 which is supported above the ground level 12 by a support body 14. The luminaire includes a fixture 16, a lamp not shown and a translucent luminaire housing 18 of predetermined color. Upon electrical energization of the lamp, the luminaire will glow with the color of the housing 18. As best seen in FIG. 4, the support body 14 comprises a tubular shaped body which extends into a frangible break-away mount 20. The break-away mount 20 is mounted to and supported at one end of an angle iron 22. The angle iron is staked at an opposite end, not shown, into the earth in order to anchor and support the mount 20. Electrical power for energizing the lamp of the luminaire 10 is supplied through an underground conduit, not illustrated, from which electrical leads 24 extends to a plug 26. Plug 26 is connected to a luminaire plug 28. An electrical lead 30 also extends from the plug 28 to the lamp of the luminaire 10.

A semi-rigid, disc shaped body 32 which is formed of a weather resistant material extends about the luminaire support body 14 and covers an area of the ground surrounding the luminaire 10. The body 32 functions to both reduce erosion of soil and the growth of foliage in that earth area surrounding the luminaire which is covered by the body 32. A means is provided and is formed in the disc body 32 for positioning the disc body 32 about the ground light support body 14. This means comprises a centrally located aperture 34 which is formed at a location substantially central in the body 32. The aperture 34 has a diameter which is slightly greater than the support 14 so that when the support 14 extends through aperture 34, there is a relatively close fit.

Installation of the disc body 32 is provided by decoupling the luminaire support body 14 from the mount 20, decoupling the electrical plugs 26 and 28, positioning the body 32 so that the mount 20 is concentrically orientated with the aperture 34 of the body 32, recoupling the electrical plugs 26 and 28 and reinserting the luminaire support body 14 into the mount 20.

The soil about the luminaire 10 is initially prepared for receiving the disc shaped body 32. It is excavated slightly and a bed comprising sand or light gravel is positioned in the excavated space. An upper surface of the body 32 is substantially level with or slightly depressed from the surface of the surrounding ground area. Alternatively, the body 32 may be positioned on the soil surface without the excavation.

The disc body 32 is preferably made of a polymer plastic as for example polyethelene and preferably has a diameter in the range of about 16 inches to about 60 inches. The thickness of the polyethelene will be in the range of about 3/16 of an inch to about ½ of an inch. This construction provides a semi-rigid body 32 which exhibits relative stiffness over a localized segment but relative flexibility over the entire body. When the body 32 comprises a polymer plastic body such as 3/16 inch thick polyethelene, it is preferred that the ground about the luminaire be excavated and prepared as described above to receive the disc body. When the body 32 comprises an alternative weather resistant material such as ¼ inch thick aluminum, the weight of the body 32 can be, depending on its diameter, sufficient to inhibit air foiling. It can then be placed directly on the surface of the earth surrounding the luminaire and the need for an excavation and preparation of the earth is not required although it may also be provided. By "air foiling" is meant that the disc body 32 may exhibit a tendency to rise and elevate under the influence of a blast of air from a jet or propeller in the vicinity. In general, if the weight of the disc body is sufficient to offset forces created by air blasts, then the body can be placed directly on earth's surface.

Figure 8:
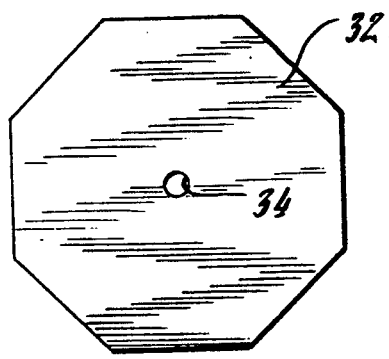
FIG. 8 is a plan view of a further alternative embodiment of the disc shaped body of the invention; and, FIG. 9 is a plan view of still another alternative embodiment of the invention.

While the embodiment of FIGS. 1-3 is shown to utilize a circular disc shaped body, the body 32 may assume other geometrical configurations. In FIG. 7, the body 32 is shown to be quadrilateral shaped and to comprise a square. This shape is advantageous in that it substantially eliminates scrap in its production. In FIG. 8, the body is shown to be hexagonal shaped.

Figure 9:
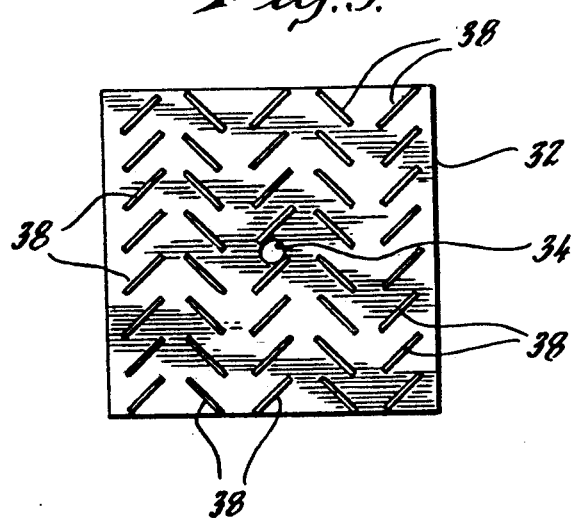

The body 32 may also include reinforcing stiffners which are integrally molded into the body. The surface of the body can also be treated to provide a slip proof surface. FIG. 9 illustrates a quadrilateral shaped body with diamond shaped risers formed on the surface thereof which function to both stiffen the body and to provide slip proofing of the surface. For ease and presentation of the drawing, the diamond shaped surface segments are shown by straight lines 38 extending at angles.

A relatively lighter weight body may also be placed directly on the earth's surface and staked in position. FIG. 7 illustrates an advantageous arrangement wherein integral corners of the quadrilateral are bent at the indicated lines 39 to form staking segments.

Installation of the embodiment of FIGS. 1-3 provides for the removal of the luminaire support body 14 from the mount 20. FIGS. 5 and 6 illustrate an alternative embodiment in which the installation is accomplished without removal of the luminaire support body 14 from the mount 20. In this arrangement a means for positioning the body about the luminaire support body comprises a centrally located aperture 40 of relatively large dimensions so as to permit the body 32 to be placed about and lowered about the luminaire without the need for removing the support body 14. A relatively thin, disc shaped collar 41 is also provided. The collar 41 can be flexed and includes a slit 42 and an aperture 43 formed therein. By deflecting the slit slightly, the collar 41 can be placed about the support body 14. The aperture forms a relatively close fit with the support body 14. A means comprising a plurality of nylon screws 44 are used to secure the collar 41 to the body 32. In FIG. 6, the preparation of the area around the luminaire is illustrated by the excavation and the placement of sand or gravel 46.

In accordance with another feature of the invention, the disc body 32 has a bright color so as to enhance the visibility of the luminaire. Preferably it simulates the color yellow used for the luminaire support body 14. Alternatively, reflective strips are placed on the body.

An improved airport light arrangement has thus been described which is relatively economical and easily installed, suppresses foliage, reduces soil erosion, enhances the visibility of the airport ground light, facilitates mowing grass outside the area covered by the disc body without damage to the airport ground light or to the mower and eliminates the use of herbicides.

While there has been described particular embodiments of the invention, it will be apparent to those skilled in the art that variations may be made thereto without departing from the spirit of the invention and the scope of the appended claims.

What is claimed is:

1. An improved aircraft ground light arrangement, comprising:
   (a) an airport ground light for guiding the movement and positioning of aircraft on the ground;
   (b) said light having a luminaire and a support body for supporting said luminaire above ground level;
   (c) a semi-rigid, disc-shaped body formed of a weather resistant material extending about said support body and covering an area surrounding said light;
   (d) an aperture formed in said disc body for positioning said disc body about said ground light support body, said aperture substantially centrally located in said disc body, said ground light support body extending through said aperture; and,
   (e) a collar having a slit formed therein, said collar positioned about said ground light support body and mounted to said disc body.

2. The improved aircraft ground light arrangement of claim 1 wherein said aperture formed in said disc body has a cross sectional area through which said luminaire can extend for positioning said disc body about said ground light.

3. The improved aircraft ground light arrangement of claim 1 wherein said disc shaped body is circular shaped and has a diameter thereof substantially in the range of about 16 inches to about 60 inches.

* * * * *